(12) United States Patent
Antony et al.

(10) Patent No.: US 8,536,788 B2
(45) Date of Patent: Sep. 17, 2013

(54) THERMAL CONTROL OF SOLID STATE LIGHT SOURCES BY VARIABLE SERIES IMPEDANCE

(75) Inventors: Biju Antony, Lynnfield, MA (US); John Cross, Needham, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 147 days.

(21) Appl. No.: 13/196,464

(22) Filed: Aug. 2, 2011

(65) Prior Publication Data

US 2012/0032612 A1 Feb. 9, 2012

Related U.S. Application Data

(60) Provisional application No. 61/371,544, filed on Aug. 6, 2010.

(51) Int. Cl.
*H01J 7/44* (2006.01)
*H05B 37/02* (2006.01)

(52) U.S. Cl.
USPC ............................................. 315/50; 315/291

(58) Field of Classification Search
USPC ................... 315/291, 307, 224, 247, 50, 312, 315/309, 311, 126
See application file for complete search history.

(56) References Cited

U.S. PATENT DOCUMENTS

| | | | | |
|---|---|---|---|---|
| 7,573,209 B2 * | 8/2009 | Ashdown et al. | ............. | 315/307 |
| 7,573,210 B2 * | 8/2009 | Ashdown et al. | ............. | 315/307 |
| 2002/0030455 A1 * | 3/2002 | Ghanem | ........................ | 315/291 |
| 2007/0085494 A1 * | 4/2007 | Takeda et al. | ................. | 315/316 |
| 2010/0045187 A1 * | 2/2010 | Shteynberg et al. | .......... | 315/149 |
| 2010/0176746 A1 | 7/2010 | Catalano et al. | | |

FOREIGN PATENT DOCUMENTS

| | | |
|---|---|---|
| JP | 2003-188415 A | 7/2003 |
| KR | 10-2006-0084571 A | 7/2006 |
| KR | 10-2008-0108784 A | 12/2008 |
| KR | 10-2010-0059421 A | 6/2010 |

OTHER PUBLICATIONS

Chang Rag Choi, International Search Report and Written Opinion of the International Searching Authority, Mar. 8, 2012, pp. 1-7, Korean Intellectual Property Office, Daejeon, Republic of Korea.

* cited by examiner

*Primary Examiner* — Minh D A
(74) *Attorney, Agent, or Firm* — Shaun P. Montana (57) ABSTRACT

A thermal protection circuit, and system and method including same, is provided. The circuit includes a variable impedance circuit configured to be coupled to a constant current source and a plurality of solid state light sources. The constant current source provides a current to the plurality of solid state light sources and provides an output voltage to establish a supply voltage for the circuit. The circuit also includes a temperature sensor configured to sense a temperature of the plurality of solid state light sources. The circuit also includes a control circuit configured to receive the supply voltage and to drive the variable impedance circuit based on the sensed temperature, to adjust the current to the plurality of solid state light sources when the supply voltage is a least a minimum supply voltage of the control circuit.

15 Claims, 10 Drawing Sheets

| 1001 COUPLE A VARIABLE IMPEDANCE CIRCUIT TO A CONSTANT CURRENT SOURCE AND A PLURALITY OF SOLID STATE LIGHT SOURCES, THE CONSTANT CURRENT SOURCE CONFIGURED TO PROVIDE A CURRENT TO THE PLURALITY OF SOLID STATE LIGHT SOURCES AND TO PROVIDE AN OUTPUT VOLTAGE TO ESTABLISH A SUPPLY VOLTAGE |
|---|

↓

| 1002 SENSE A TEMPERATURE OF THE PLURALITY OF SOLID STATE LIGHT SOURCES USING A TEMPERATURE SENSOR |
|---|

↓

| 1003 DRIVE THE VARIABLE IMPEDANCE CIRCUIT BY A CONTROL CIRCUIT, TO ADJUST THE CURRENT TO THE PLURALITY OF SOLID STATE LIGHT SOURCES WHEN A SUPPLY VOLTAGE IS AT LEAST A MINIMUM SUPPLY VOLTAGE OF THE CONTROL CIRCUIT |
|---|
| 1004 DRIVE THE VARIABLE IMPEDANCE CIRCUIT TO A LOW IMPEDANCE STATE BY A LOW VOLTAGE COMPENSATION CIRCUIT WHEN THE SUPPLY VOLTAGE IS BELOW THE MINIMUM SUPPLY VOLTAGE, INDEPENDENT OF THE SENSED TEMPERATURE |
| 1005 DRIVE THE VARIABLE IMPEDANCE CIRCUIT, VIA A COMPARATOR CIRCUIT OF THE CONTROL CIRCUIT, TO A HIGH IMPEDANCE STATE WHEN THE SENSED TEMPERATURE IS GREATER THAN OR EQUAL TO A PRE-DETERMINED THRESHOLD TEMPERATURE, WHEREIN THE COMPARATOR CIRCUIT IS COUPLED TO A TEMPERATURE THRESHOLD CIRCUIT AND THE TEMPERATURE SENSOR |
| 1006 DRIVE THE VARIABLE IMPEDANCE CIRCUIT, VIA A COMPARATOR CIRCUIT OF THE CONTROL CIRCUIT, TO AN IMPEDANCE BETWEEN A HIGH IMPEDANCE STATE AND A LOW IMPEDANCE STATE BASED ON A DIFFERENCE BETWEEN THE SENSED TEMPERATURE AND A PRE-DETERMINED THRESHOLD TEMPERATURE |

↓

| 1007 ISOLATE THE CONTROL CIRCUIT FROM THE VARIABLE IMPEDANCE CIRCUIT, VIA A LOW VOLTAGE CONTROL CIRCUIT, WHEN THE SUPPLY VOLTAGE IS BELOW THE MINIMUM SUPPLY VOLTAGE, WHEREIN THE LOW VOLTAGE CONTROL CIRCUIT IS PART OF THE LOW VOLTAGE COMPENSATION CIRCUIT |
|---|

↓

| 1008 MAINTAIN, VIA AN ENERGY STORAGE ELEMENT OF THE LOW VOLTAGE COMPENSATION CIRCUIT, THE SUPPLY VOLTAGE ABOVE THE MINIMUM SUPPLY VOLTAGE FOR A TIME PERIOD AFTER THE OUTPUT VOLTAGE DECREASES TO BELOW THE MINIMUM SUPPLY VOLTAGE |
|---|

FIG. 10

THERMAL CONTROL OF SOLID STATE LIGHT SOURCES BY VARIABLE SERIES IMPEDANCE

CROSS-REFERENCE TO RELATED APPLICATION

The present application claims priority of U.S. Provisional Application No. 61/371,544, filed Aug. 6, 2010, the entire contents of which are hereby incorporated by reference.

TECHNICAL FIELD

The present invention relates to lighting, and more specifically, to electronic control of solid state light sources.

BACKGROUND

A solid state light source, such as but not limited to a light emitting diode (LED) of any type (e.g., LED, OLED, PLED, etc.), is a current driven electronic device. Typically, one or more solid state light sources are driven by a current source, such as but not limited to a constant current source. A solid state light source, either alone or when located within a module such as a light engine, may additionally include an optical system (e.g., a lens) and/or an associated wavelength-converting element, such as but not limited to a phosphor. These additional elements, either separately or together, may convert the primary light output of the solid state light source to a secondary light output of a different wavelength/color.

The light output level of the solid state light source may be adjusted by adjusting the output current of the constant current source using conventional dimming techniques. For example, a light output level of a light engine including one or more solid state light sources may be adjusted by pulse-width-modulation (PWM) or amplitude modulation of the output current of the constant current source, or by adjusting a steady state DC output of the constant current source.

SUMMARY

One consideration in the design of a module including one or more solid state light sources is the heat generated by the module, and more particularly, by the solid state light sources. In some situations, it may be useful to at least temporarily remove power to a solid state light source module in the event the temperature in a region adjacent the module exceeds a threshold temperature. Thermal control and/or thermal shutdown due to over-temperature conditions in a solid state light source module may be implemented using a conventional bi-metallic thermal switch positioned on a printed circuit board (PCB) attached to the solid state light sources and/or the module. The bi-metallic thermal switch is configured to open the circuit and cut power to the module in response to an over-temperature condition.

A conventional bi-metallic switch, however, may be bulky and thus may occupy significant space within the module. In some designs, a solid state light source module may have a large amount of available space in which to incorporate such a switch. However, particularly in module designs where space is at a premium, use of such a switch may not be practical. Further, regardless of space availability, such switches typically have a somewhat limited life in comparison with the expected lifetime of a lighting module including solid state light sources such as LEDs.

Embodiments of the present invention provide a thermal protection circuit that generally includes a temperature sensor, a variable impedance circuit, and a control circuit. The variable impedance circuit is coupled in series with a current source (e.g., a constant current source) and a plurality of solid state light sources (either separate from or as part of one or more modules). The thermal protection circuit is configured to control the variable impedance circuit based on the sensed temperature to reduce the current to the plurality of solid state light sources. If the sensed temperature exceeds a predetermined threshold temperature when a supply voltage to the control circuit exceeds a minimum supply voltage of the control circuit, the thermal protection circuit activates.

In some embodiments, the input voltage to the thermal protection circuit is provided by an output voltage of the current source (e.g., a constant current source), which may vary depending on the impedance of the load driven by the current source and/or a selected dimming input setting. At a low current source output voltage, e.g. resulting from a low dimmer setting, the input voltage to the thermal protection circuit may fall below a minimum supply voltage of at least a portion of the control circuit. The thermal protection circuit thus may include a low voltage compensation circuit configured to compensate for an input voltage below a minimum supply voltage.

For example, the thermal protection circuit may be configured to drive the variable impedance circuit to a low impedance state, independent of the control circuit, when the input voltage falls below a low voltage threshold corresponding to the minimum supply voltage. This allows normal operation of the solid state light sources at very low light output levels, for example as established by a low dimmer setting. The low voltage compensation circuit may be further configured to compensate for effects of the variation in the input voltage on the supply voltage to the control circuit. For example, the low voltage compensation circuit may include an energy storage element, e.g., a capacitor, configured to slow the decrease in the input voltage during dimming.

In an embodiment, there is provided a thermal protection circuit. The thermal protection circuit includes: a variable impedance circuit configured to be coupled to a constant current source and a plurality of solid state light sources, the constant current source configured to provide a current to the plurality of solid state light sources and to provide an output voltage to establish a supply voltage for the thermal protection circuit; a temperature sensor configured to sense a temperature of the plurality of solid state light sources; and a control circuit configured to receive the supply voltage and to drive the variable impedance circuit based on the sensed temperature, to adjust the current to the plurality of solid state light sources when the supply voltage is a least a minimum supply voltage of the control circuit.

In a related embodiment, the thermal protection circuit may further include a low voltage compensation circuit configured to drive the variable impedance circuit to a low impedance state when the supply voltage is below the minimum supply voltage, independent of the sensed temperature. In a further related embodiment, the low voltage compensation circuit may include a low voltage control circuit configured to isolate the control circuit from the variable impedance circuit when the supply voltage is below the minimum supply voltage. In another further related embodiment, the low voltage compensation circuit may include an energy storage element configured to maintain the supply voltage above the minimum supply voltage for a time period after the output voltage decreases to below the minimum supply voltage.

In another related embodiment, the control circuit may include a temperature threshold circuit; and a comparator circuit; wherein the comparator circuit may be coupled to the temperature threshold circuit and the temperature sensor, and the comparator circuit may be configured to drive the variable impedance circuit to a high impedance state when the sensed temperature is greater than or equal to a pre-determined threshold temperature. In a further related embodiment, the comparator circuit may be configured to drive the variable impedance circuit to an impedance between a high impedance state and a low impedance state based on a difference between the sensed temperature and a pre-determined threshold temperature.

In yet another related embodiment, the plurality of solid state light sources may be located in a plurality of solid state light source modules.

In another embodiment, there is provided a thermal protection lighting system. The thermal protection lighting system includes: a plurality of solid state light sources located in one or more solid state light source modules; a constant current source configured to provide a current to the plurality of solid state light sources and an output voltage to establish a supply voltage; and a thermal protection circuit including: a variable impedance circuit coupled to the constant current source and the plurality of solid state light sources; a temperature sensor configured to sense a temperature of the plurality of solid state light sources; and a control circuit configured to receive the supply voltage and to drive the variable impedance circuit based on the sensed temperature to control the current to the plurality of solid state light sources when the supply voltage is a least a minimum supply voltage of the control circuit.

In a related embodiment, the thermal protection circuit may include a low voltage compensation circuit configured to drive the variable impedance circuit to a low impedance state when the supply voltage is below the minimum supply voltage, independent of the sensed temperature. In a further related embodiment, the low voltage compensation circuit may include a low voltage control circuit configured to isolate the control circuit from the variable impedance circuit when the supply voltage is below the minimum supply voltage. In another further related embodiment, the low voltage compensation circuit may include an energy storage element configured to maintain the supply voltage above the minimum supply voltage for a time period after the output voltage decreases to below the minimum supply voltage.

In another related embodiment, the control circuit may include: a temperature threshold circuit; and a comparator circuit; wherein the comparator circuit may be coupled to the temperature threshold circuit and the temperature sensor, and the comparator circuit may be configured to drive the variable impedance circuit to a high impedance state when the sensed temperature is greater than or equal to a predetermined threshold temperature. In a further related embodiment, the comparator circuit may be configured to drive the variable impedance circuit to an impedance between a high impedance state and a low impedance state based on a difference between the sensed temperature and a pre-determined threshold temperature.

In yet another related embodiment, the constant current source may be configured to receive a dimming input signal and to provide the current to the plurality of solid state light sources based on the dimming input.

In another embodiment, there is provided a method of providing thermal protection. The method includes: coupling a variable impedance circuit to a constant current source and a plurality of solid state light sources, the constant current source configured to provide a current to the plurality of solid state light sources and to provide an output voltage to establish a supply voltage; sensing a temperature of the plurality of solid state light sources using a temperature sensor; and driving the variable impedance circuit by a control circuit, to adjust the current to the plurality of solid state light sources when a supply voltage is at least a minimum supply voltage of the control circuit.

In a related embodiment, driving may include driving the variable impedance circuit to a low impedance state by a low voltage compensation circuit when the supply voltage is below the minimum supply voltage, independent of the sensed temperature. In a further related embodiment, the method may further include isolating the control circuit from the variable impedance circuit, via a low voltage control circuit, when the supply voltage is below the minimum supply voltage, wherein the low voltage control circuit is part of the low voltage compensation circuit. In another further related embodiment, the method may further include maintaining, via an energy storage element of the low voltage compensation circuit, the supply voltage above the minimum supply voltage for a time period after the output voltage decreases to below the minimum supply voltage.

In another related embodiment, driving may include: driving the variable impedance circuit, via a comparator circuit of the control circuit, to a high impedance state when the sensed temperature is greater than or equal to a pre-determined threshold temperature, wherein the comparator circuit is coupled to a temperature threshold circuit and the temperature sensor. In a further related embodiment, driving may include driving the variable impedance circuit, via a comparator circuit of the control circuit, to an impedance between a high impedance state and a low impedance state based on a difference between the sensed temperature and a pre-determined threshold temperature.

BRIEF DESCRIPTION OF THE DRAWINGS

The foregoing and other objects, features and advantages disclosed herein will be apparent from the following description of particular embodiments disclosed herein, as illustrated in the accompanying drawings, in which like reference characters refer to the same parts throughout the different views. The drawings are not necessarily to scale, emphasis instead being placed upon illustrating the principles disclosed herein.

FIG. 10 is a block flow diagram of a method according to embodiments disclosed herein.

DETAILED DESCRIPTION

Figure 1:
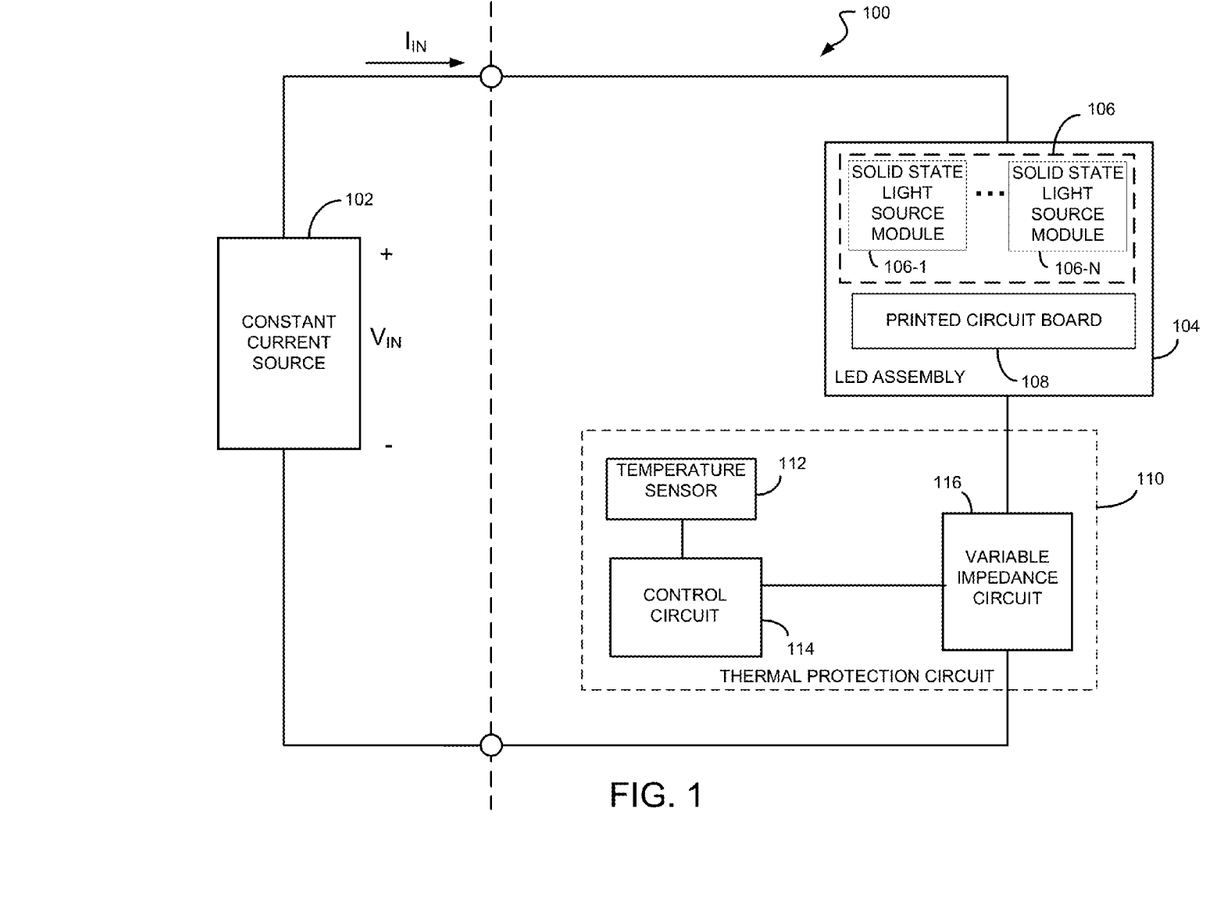
FIG. 1 shows a block diagram of a thermal protection lighting system according to embodiments disclosed herein.

FIG. 1 is a block diagram of a thermal protection lighting system 100 (hereinafter system 100) according to embodiments described herein. The system 100 includes a constant current source 102, an LED assembly 104, and a thermal protection circuit 110. The constant current source 102 may be a known current source configured to supply a relatively constant current $I_{IN}$ to the LED assembly 104 and a variable input voltage $V_{IN}$ to the system 100. The variable input voltage $V_{IN}$ from the constant current source 102 may be used to establish a supply voltage for operation of the thermal protection circuit 110.

The LED assembly 104 may include a plurality of solid state light source modules 106-1 ... 106-n, collectively solid state light source modules 106, and a printed circuit board (PCB) 108. Each solid state light source module 106-1 ... 106-n includes at least one solid state light source. Thus, a solid state light source module 106 may include a plurality of solid state lights sources. In some embodiments, the solid state light source modules 106 may be mounted on the printed circuit board (PCB) 108 or an equivalent substrate. In some embodiments (not shown in FIG. 1), the constant current source 102 may be provided locally, e.g. on and/or in connection with the same printed circuit board 108 as the LED assembly 104 or the thermal protection circuit 110, or may be positioned remotely therefrom, e.g. on a physically separate printed circuit board or in a separate housing.

The thermal protection circuit 110 includes a temperature sensor 112, a control circuit 114, and a variable impedance circuit 116. In general, the thermal protection circuit 110 is configured to reduce the current through the solid state light source modules 106 to at or near zero, e.g. to turn the solid state light source(s) off, when the temperature sensor 112 indicates that the temperature adjacent the solid state light source modules 106 exceeds a predetermined threshold. When the temperature sensor 112 indicates that the temperature adjacent the solid state light source modules 106 has dropped below the predetermined threshold, the thermal protection circuit 110 may return current through the solid state light source modules 106 to a normal operating value, e.g. turn the solid state light sources on.

The temperature sensor 112 may be any known type of temperature sensor, such as but not limited to a thermistor or an integrated circuit temperature sensor. The temperature sensor used in the system 100 should have a characteristic, such as resistance, or an output, that varies with the temperature associated with the solid state light source modules 106 and may be positioned in or on the LED assembly 104. For example, the temperature sensor 112 may be mounted on, or adjacent to, the printed circuit board 108. The temperature sensor may be described herein as providing an "output" that indicates temperature or as simply "indicating" temperature. It is to be understood that, as used herein, such terms refer to a temperature-dependent value, characteristic or output of the temperature sensor and/or the value, characteristic or output of a component or system coupled to the temperature sensor. For example, a thermistor temperature sensor has a temperature-dependant resistance that may modify a threshold voltage to a comparator circuit. The temperature-dependant resistance of the thermistor may be described herein as indicating temperature or as an "output" of the temperature sensor that indicates temperature.

The control circuit 114 is coupled to the temperature sensor 112 and the variable impedance circuit 116. In some embodiments, the control circuit 114 is positioned on the printed circuit board 108. Alternatively, or additionally, the control circuit 114 is remote (e.g. not on the same printed circuit board and/or not in the same housing) therefrom. The variable impedance circuit 116 exhibits an impedance that varies, e.g. discretely or linearly, in response to the output of the control circuit 114. The control circuit 114 is configured to set the impedance of the variable impedance circuit 116 in response to the output of the temperature sensor 112. For example, if the temperature sensor 112 indicates that the temperature adjacent thereto exceeds a predetermined threshold, the control circuit 114 may be configured to set the variable impedance circuit 116 to a high impedance state to reduce the current to the solid state light source modules 106 to at or near zero. If the temperature sensor 112 indicates that the temperature adjacent thereto is, or has fallen, below the predetermined threshold, the control circuit 114 may be configured to set the variable impedance circuit 116 to a low impedance state that is lower than its high impedance state. The low impedance state may be configured to minimize the effect of the variable impedance circuit 116 on the light output level of the solid state light source modules 106 and to minimize the power dissipation in the variable impedance circuit 116. The control circuit 114 may be configured to set the impedance of the variable impedance circuit 116 with discrete changes between the high and low impedance states, or may be configured to establish gradual transition of the impedance of the variable impedance circuit 116 between the high and low impedance states. A gradual transition between the high and low impedance states may operate to dim the light output level of the solid state light source modules 106 prior to turning them off in an over-temperature condition.

Figure 2:
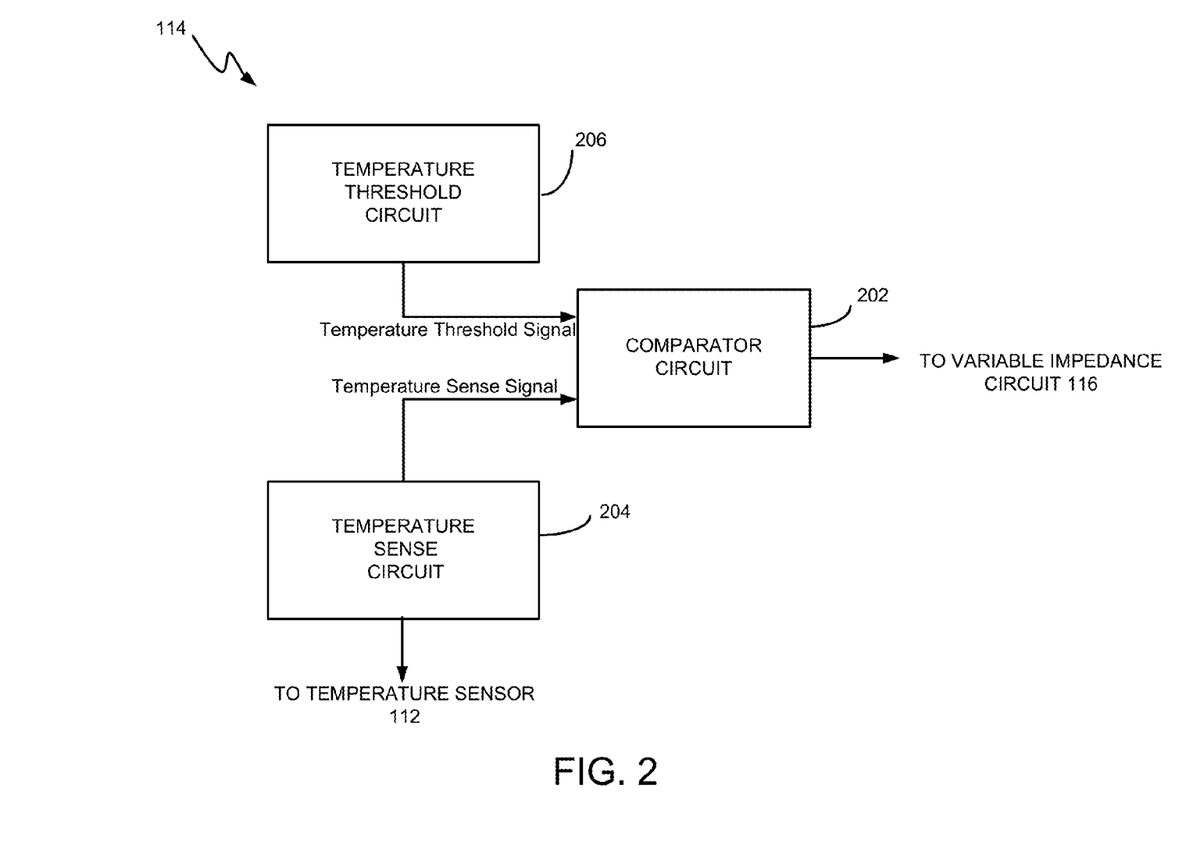
FIG. 2 is a block diagram of a control circuit of the thermal protection lighting system of FIG. 1.

FIG. 2 is a block diagram of an embodiment of the control circuit 114 shown in FIG. 1. The control circuit 114 includes a comparator circuit 202, a temperature sense circuit 204, and a temperature threshold circuit 206. The comparator circuit 202 is coupled to the temperature sense circuit 204 and the temperature threshold circuit 206, and is configured to provide an output to the variable impedance circuit 116. The temperature sense circuit 204 is configured to provide a temperature sense signal to the comparator circuit 202. For example, in some embodiments, the temperature sense signal is representative of the temperature-dependent (e.g., resistance) value of the temperature sensor 112 shown in FIG. 1. The temperature threshold circuit 206 is configured to provide a temperature threshold signal representative of a predetermined threshold temperature to the comparator circuit 202. The comparator circuit 202 provides an output based, at least in part, on the relative values (e.g., difference between the values) of the temperature sense signal and the temperature threshold signal. For example, if the temperature sense signal is greater than the temperature threshold signal, then the comparator circuit 202 may be configured to set the variable impedance circuit 116 to a high impedance state, reducing the current to the solid state light source modules 106. If the temperature sense signal is less than the temperature threshold signal, then the comparator circuit 202 may be configured to set the variable impedance circuit 116 to a low impedance state, allowing current to the solid state light source modules 106 based on the dimming input.

In some embodiments, the comparator circuit 202 is configured with hysteresis so that the output of the comparator circuit 202 depends on the output of a comparator (not shown in FIG. 2) within the comparator circuit 202 as well as the temperature sense signal and the temperature threshold signal. As is known, a comparator circuit with hysteresis provides more stable switching by changing state (of the output) at different input levels depending on whether the input (i.e., temperature sense signal) is increasing from below a threshold (i.e., temperature threshold signal) or decreasing from above the threshold (i.e., temperature threshold signal).

Figure 3:
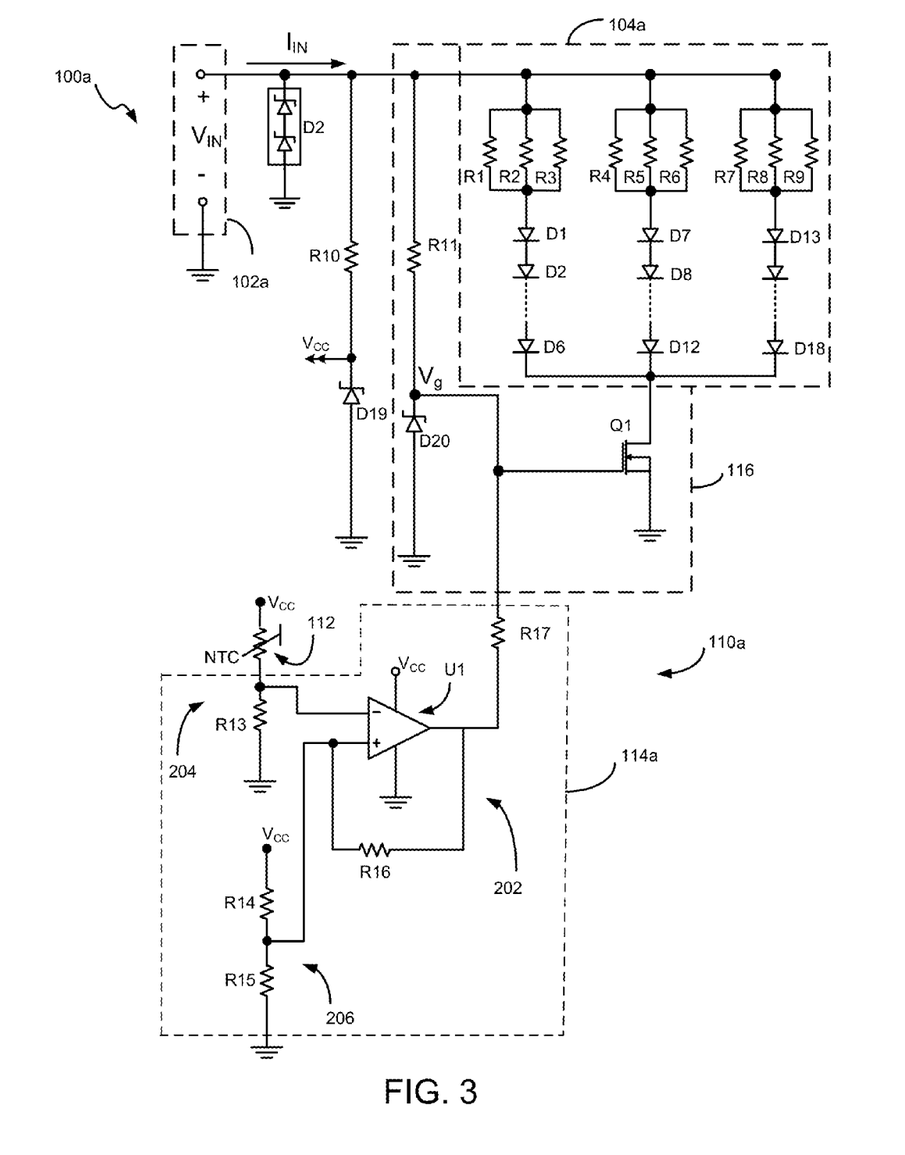
FIG. 3 is a schematic diagram of a thermal protection lighting system according to embodiments disclosed herein.

FIG. 3 is a schematic diagram of a thermal protection lighting system 100a. The system 100a includes an LED assembly 104a and thermal protection circuit 110a. The LED assembly 104a includes a plurality of solid state light source modules D1-D18 arranged in a plurality of serial strings where the strings are coupled in parallel. The LED assembly 104a further includes a plurality of resistors R1-R9, configured to account for manufacturing variability in the resistance between individual solid state light sources within the solid state light source modules D1-D18, as will be understood by those skilled in the art.

The thermal protection circuit 110a includes a temperature sensor 112, a control circuit 114a, and a variable impedance circuit 116. In FIG. 3, the temperature sensor 112 is a negative temperature coefficient (NTC) thermistor. In some embodiments, the temperature sensor 112 may be placed adjacent the LED assembly 104a so that the output of the temperature sensor 112 varies with the temperature of the assembly and/or the solid state light source modules D1-D18. The control circuit 114a includes a temperature sense circuit 204, a temperature threshold circuit 206, and a comparator circuit 202 with hysteresis. A supply voltage $V_{CC}$ to the control circuit 114a is provided by coupling an input voltage $V_{IN}$ supplied by a constant current source 102a across a resistor R10 and a Zener diode D19. Supplying the supply voltage $V_{CC}$ from the input voltage $V_{IN}$ supplied by the constant current source 102a allows the control circuit 114a and the temperature sensor 112 to be positioned remotely from the constant current source 102a, e.g. on the same printed circuit board as at least one of the solid state light source modules D1-D18, thereby allowing compact and/or retrofit configurations.

The comparator circuit 202 includes a comparator U1 and a resistor R16 coupled between a non-inverting input and an output of the comparator U1. The temperature sense circuit 204 includes a resistor R13 coupled to the temperature sensor 112 and the supply voltage $V_{CC}$ in a voltage divider. The temperature sense circuit 204 is configured to provide a temperature sense signal, i.e. a voltage determined by the temperature sensor 112, the resistor R13, and the supply voltage $V_{CC}$, to an inverting input of the comparator U1 representative of the output of the temperature sensor 112 and the temperature adjacent the LED assembly 104a. The temperature threshold circuit 206 includes a resistor R14 coupled to a resistor R15 and the supply voltage $V_{CC}$ in a voltage divider. The temperature threshold circuit 206 is configured to provide a temperature threshold signal, i.e. a threshold voltage determined by the resistor R15, the resistor R14, and the supply voltage $V_{CC}$, to the non-inverting input of the comparator U1 that corresponds to a nominal threshold temperature of the LED assembly 104a and/or the solid state light source modules D1-D18.

The variable impedance circuit 116 is coupled to the output of the control circuit 114a through a resistor R17 and includes a transistor Q1, a resistor R11, and a Zener diode D20. The transistor Q1 is coupled between the LED assembly 104a and a ground potential. The resistor R11 and the Zener diode D20 are configured to establish a gate voltage $V_g$ to maintain the transistor Q1 in a low impedance state (i.e., a conducting state) without an output from the control circuit 114a. The low impedance state corresponds to a drain to source resistance $R_{ds}$ for the transistor Q1 of $R_{ds(ON)}$, i.e., the specified ON resistance value of the transistor Q1. As is known, a relatively small $R_{ds(ON)}$ corresponds to a lower power dissipation and a lower associated heat generation than a relatively larger value. The transistor Q1 may therefore be selected to have an appropriate $R_{ds(ON)}$ based on the current through the plurality of solid state light source modules D1-D18.

The control circuit 114a is configured to drive the transistor Q1 to a high impedance state (i.e., a non-conducting state) when the temperature sense signal from the temperature sense circuit 204 exceeds the temperature threshold signal from the threshold circuit 206. As a result of the hysteresis provided by the resistor R16, the control circuit 114a is further configured to drive the transistor Q1 to a low impedance state when the temperature sense signal from the temperature sense circuit 204 decreases from a temperature greater than a first predefined temperature threshold value of the temperature threshold signal to a temperature below a second predefined temperature threshold value of the temperature threshold signal. The first and second predefined temperature thresholds may be set based on selection of the resistors R14, R15 and R16. The first predefined temperature threshold value may be greater than the second predefined temperature threshold value.

Figure 4:
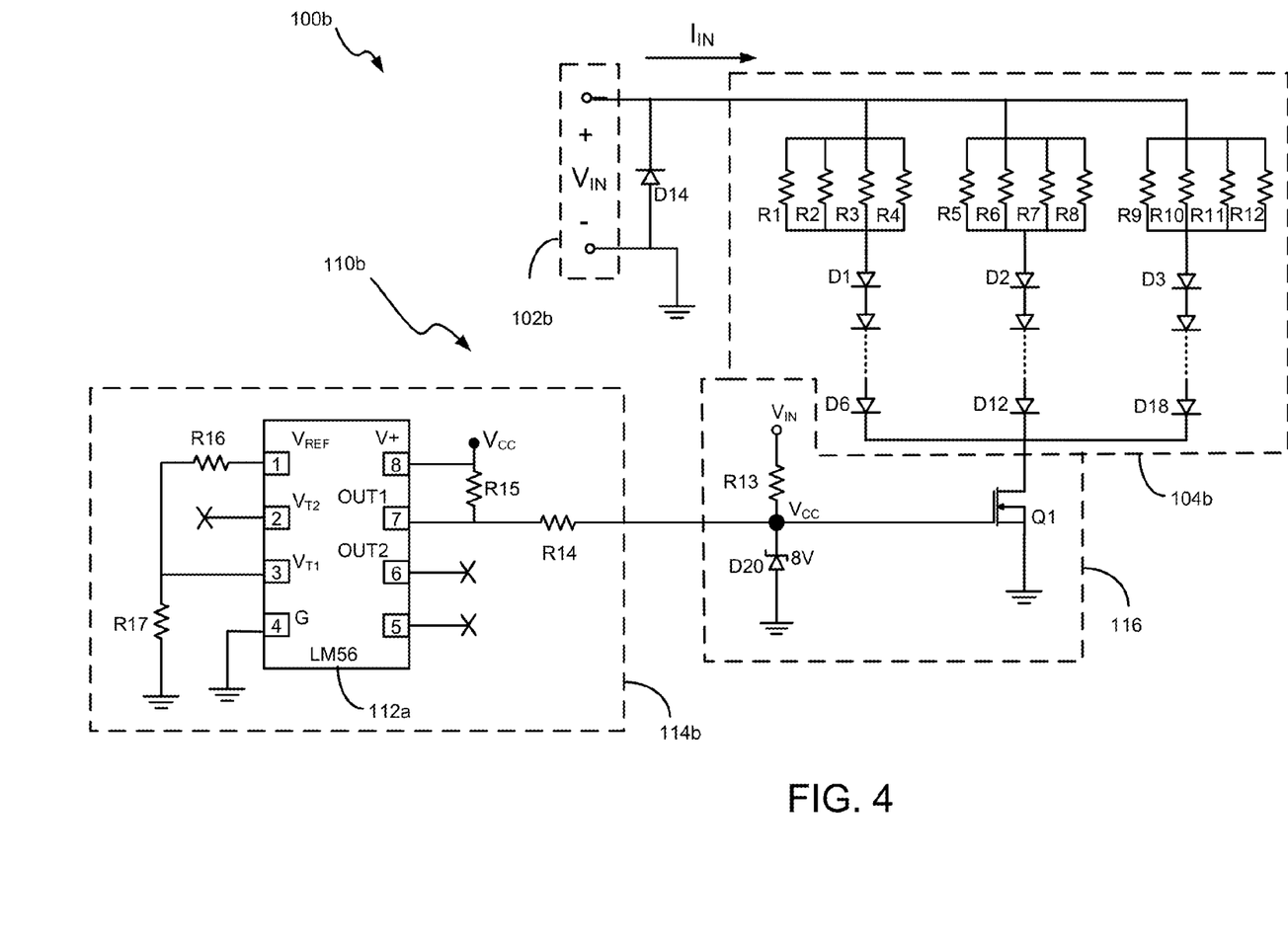
FIG. 4 a schematic diagram of a thermal protection lighting system according to embodiments disclosed herein.

FIG. 4 is a schematic diagram of another embodiment of a thermal protection lighting system 100b (hereinafter system 100b) that thermally controls strings of solid state light sources (e.g., LEDs) by variable impedance. The system 100b includes an LED assembly 104b and a thermal protection circuit 110b. The thermal protection circuit 110b includes a variable impedance circuit 116, a control circuit 114b, and a temperature sensor 112b. In FIG. 4, the temperature sensor 112b is an integrated circuit configured to sense a temperature, compare the sensed temperature to a predetermined threshold temperature, and to provide an output OUT 1 configured to drive a transistor Q1 of the variable impedance circuit 116 through a resistor R14 based on the sensed temperature. For example, the integrated circuit 112b may be an LM56 dual output low power thermostat available from National Semiconductor Corporation, which includes a temperature sensor and a comparator with hysteresis. Although an LM56 is shown, other integrated circuits and/or equivalent circuits with similar functionality may be used without departing from the scope of the invention, as will be understood by one skilled in the art.

In FIG. 4, a supply voltage $V_{CC}$ for the control circuit 114b is obtained by applying an input voltage $V_{IN}$ (i.e., an output of a constant current source 102b) across a resistor R13 and a Zener diode D20. The gate of the transistor Q1 is biased at the value of the supply voltage $V_{CC}$ to place the transistor Q1 in a low impedance state (i.e., a conducting state) since the transistor Q1 is coupled between the LED assembly 104a and a ground potential. The control circuit 114b, including the temperature sensor 112b, is configured to drive the transistor Q1 to a high impedance state (i.e., a non-conducting state) when the output of the temperature sensor 112b increases to exceed a first predefined temperature threshold. The control circuit 114b is further configured to place the transistor Q1 in a low impedance state when the sensed temperature decreases from a temperature greater than the first predefined temperature threshold to a temperature below a second predefined temperature threshold.

Values of the first and second predefined temperature thresholds may be set based on selection of values of the resistors R14, R15, R16 and R17. With hysteresis, the first predefined temperature threshold may be greater than the second predefined temperature threshold. In this manner, current through the solid state light sources in the solid state light source modules D1-D18 may be controlled based on a sensed temperature and thermal protection of the solid state light source modules is provided.

Figure 5:
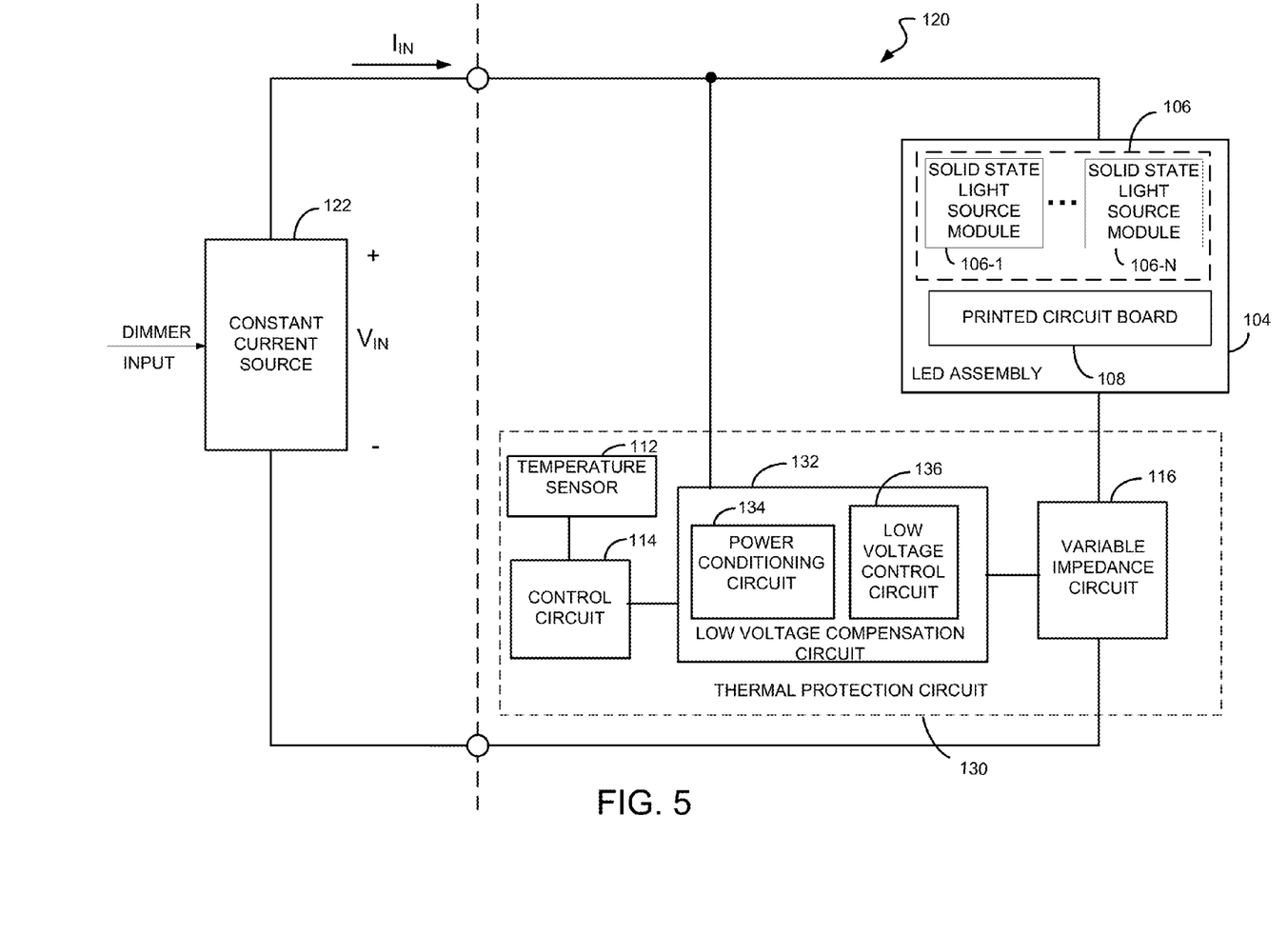
FIG. 5 is a block diagram of a thermal protection lighting system according to embodiments disclosed herein.

FIG. 5 is a block diagram of another thermal protection lighting system 120 (hereinafter system 120). Similar to the system 100 shown in FIG. 1, the system 120 includes a constant current source 122, an LED assembly 104, and a thermal protection circuit 130. The constant current source 122 is configured to supply an input current $I_{IN}$ to the LED assembly 104 and an input voltage current $V_{IN}$ used to obtain a supply voltage $V_{CC}$ to power the thermal protection circuit 130.

The light output level of the solid state light source modules 106 may be controlled by adjusting the input current $I_{IN}$ provided by the constant current source 122. The input current $I_{IN}$ is adjusted by a dimming input to the constant current source 122 that establishes, for example, a pulse width modulation, amplitude modulation, or changing steady state in the input current $I_{IN}$. For example, if pulse width modulation is used, the average value of the input current $I_{IN}$ may depend on the duty cycle (pulse width versus period) of the pulse width modulated (PWM) input current $I_{IN}$ and the pulse width is established by the dimming input. Independent of the dimming method used, the input current $I_{IN}$ supplied to the solid state light source modules 106 and the power to the thermal protection circuit 130 may depend on the dimming input setting.

The thermal protection circuit 130 includes a temperature sensor 112, a control circuit 114, a variable impedance circuit 116, and a low voltage compensation circuit 132. The temperature sensor 112 is coupled to the control circuit 114. The low voltage compensation circuit 132 is coupled to the control circuit 114, the constant current source 122, and the variable impedance circuit 116. In some embodiments, the low voltage compensation circuit 132 includes a power conditioning circuit 134 and a low voltage control circuit 136. In such embodiments, the power conditioning circuit 134 is coupled between the constant current source 122 and the control circuit 114, and the low voltage control circuit 136 is coupled between the control circuit 114 and the variable impedance circuit 116.

The low voltage control circuit 136 is configured to drive the variable impedance circuit 116 independent of temperature when the dimming input to the constant current source 122 corresponds to a very low light output level. At very low light output levels, the dimming input may establish a relatively low input current $I_{IN}$, and correspondingly, a relatively low input voltage $V_{IN}$. For some relatively low light output levels, the input voltage $V_{IN}$ may be less than a minimum supply voltage $V_{CCmin}$ of one or more components of the control circuit 114, which may result in unstable operation of the component and/or the control circuit 114. In order to avoid unstable operation, the low voltage control circuit 136 is configured to drive the variable impedance circuit 116 to the low impedance state, independent of the control circuit 114 output, when the input voltage $V_{IN}$ is below the minimum supply voltage $V_{CCmin}$ of the control circuit 114.

The power conditioning circuit 134 is configured to compensate for effects of dimming inputs corresponding to relatively low light output levels of the solid state light source modules 106. The power conditioning circuit 134 is configured to provide energy storage to maintain the supply voltage $V_{CC}$ to the control circuit 114 at a level greater than the minimum supply voltage $V_{CCmin}$ for a greater period of time than an uncompensated supply voltage $V_{CC}$. For example, an energy storage element may maintain the supply voltage $V_{CC}$ to the control circuit 114 above the minimum supply voltage $V_{CCmin}$ for a time period after the input voltage $V_{IN}$ to the plurality of solid state light source modules 106 has decreased to below the minimum supply voltage $V_{CCmin}$. the power conditioning circuit 134 is configured to filter the input voltage $V_{IN}$ to reduce electrical noise in the supply voltage $V_{CC}$ to the control circuit 114 (e.g., due to pulse-width modulating the constant current source 122).

Figure 6:
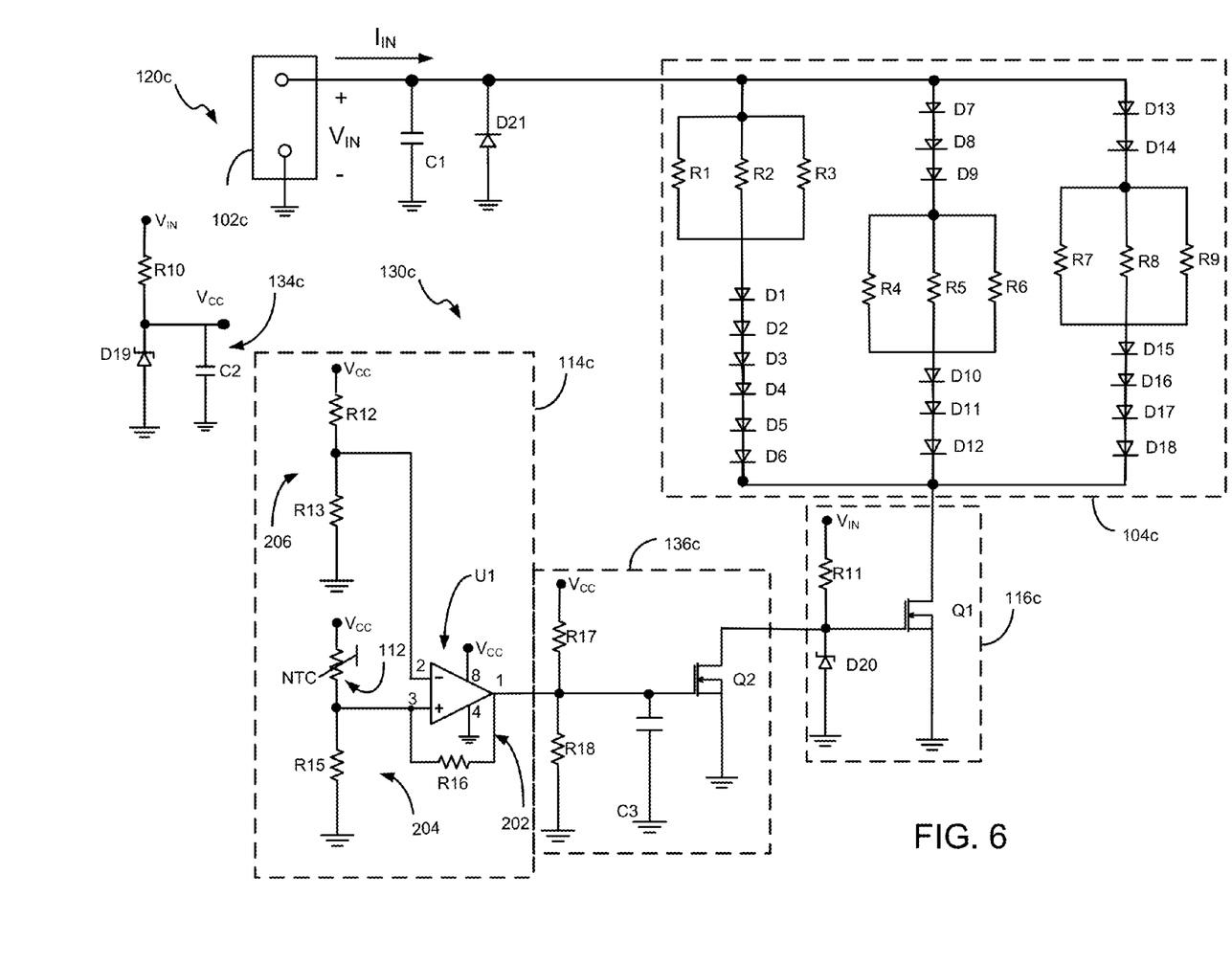
FIG. 6 a schematic diagram of a thermal protection lighting system according to embodiments disclosed herein.

FIG. 6 is a schematic diagram of a thermal protection lighting system 120c (hereinafter system 120c). The system 120c includes an LED assembly 104c and a thermal protection circuit 130c including a variable impedance circuit 116c, a control circuit 114c, and a low voltage compensation circuit including a power conditioning circuit 134c and a low voltage control circuit 136c. The power conditioning circuit 134c is configured to compensate for effects of variation in an input voltage $V_{IN}$ on a supply voltage $V_{CC}$ supplied to the control circuit 114c. The low voltage control circuit 136c is configured to prevent unstable operation of the thermal protection circuit 130c when the input voltage $V_{IN}$ decreases so that the supply voltage $V_{CC}$ to the control circuit 114c is below the minimum supply voltage $V_{CCmin}$ of a comparator U1 of the control circuit 114c.

Of course, the supply voltage $V_{CC}$ and the minimum supply voltage $V_{CCmin}$ depend on the configuration of the thermal protection circuit 130c and the components thereof. In some embodiments, the supply voltage $V_{CC}$ may be set to a nominal value of about 5.0V and the minimum supply voltage $V_{CCmin}$ may be about 3.5V. As used herein, use of the term "nominal" or "nominally" when referring to an amount means a designated or theoretical amount that may vary from the actual amount.

The power conditioning circuit 134c shown in FIG. 6 establishes the supply voltage $V_{CC}$ for the control circuit 114c and includes a resistor R10, a Zener diode D19, and a capacitor C2. The resistor R10 and the Zener diode D19 are coupled between the input voltage $V_{IN}$ and a ground potential, and the capacitor C2 is coupled in parallel with the Zener diode D19. The capacitor C2 is configured to provide energy storage for the supply voltage $V_{CC}$, e.g., when a constant current source 102c is configured to provide a relatively low current (and corresponding voltage). For example, the constant current source 102c, in some embodiments, may be configured to provide a relatively low pulse width modulated current based on a dimming input setting corresponding to a relatively low light output level for the plurality of solid state light source modules. As a result, the supply voltage $V_{CC}$ may exhibit an exponential decay associated with discharge of the capacitor C2 when the input voltage $V_{IN}$ drops below the Zener voltage of the Zener diode D19, e.g., for a pulse width modulated constant current source.

The low voltage control circuit 136c includes a transistor Q2, resistors R17 and R18, and a capacitor C3 coupled between the output of the control circuit 114c and the variable impedance circuit 116c. The resistors R17 and R18 are coupled between the supply $V_{CC}$ and a ground potential, and the node between the resistors R17 and R18 is coupled to a gate of the transistor Q2 and an output of the control circuit 114c. A drain of the transistor Q2 is coupled to a gate of the transistor Q1. The capacitor C3 is coupled between the gate of the transistor Q2 and a ground potential.

The resistor R17 and R18 thus provide a voltage divider for charging the capacitor C3 to place the transistor Q2 in a non-conducting state and thereby maintain the transistor Q1 in a low impedance state (i.e., conducting) when the supply voltage $V_{CC}$ is less than the minimum supply voltage $V_{CCmin}$. For example, the supply voltage $V_{CC}$ may be less than a minimum supply voltage $V_{CCmin}$ when the dimming input is set to provide a very low light output level, or the supply $V_{CC}$ may be less than a minimum supply voltage $V_{CCmin}$ for a time during power up of the system 120c. The low voltage control circuit 136c is configured to allow the control circuit 114c to control the conduction state of the transistor Q2 and thereby control the impedance state of the transistor Q1 when the supply voltage $V_{CC}$ is above the threshold voltage corresponding to the minimum supply voltage $V_{CCmin}$ of the control circuit 114c. The low voltage control circuit 136c allows operation of the solid state light source modules 106 under low light output conditions and supports thermal protection of the solid state light source modules 106 when the supply voltage $V_{CC}$ exceeds the minimum supply voltage $V_{CCmin}$ of the control circuit 114c.

Accordingly, the system 120c is configured to provide thermal protection to the solid state light source modules 106 in the LED assembly 104c when the supply voltage $V_{CC}$ to the control circuit 114c is at least a threshold voltage corresponding to the minimum supply voltage $V_{CCmin}$ of the control circuit 114c. The low voltage control circuit 136c is configured to provide stable operation of the thermal protection circuit 130c when the supply voltage $V_{CC}$ to the control circuit 114c is below the threshold voltage by isolating the control circuit 114c from the variable impedance circuit 116c. In this mode, the variable impedance circuit 116c is configured to maintain the transistor Q1 in a low impedance state so that the solid state light source modules 106 may provide a light output corresponding to the dimming input to the constant current source 102c.

Figure 7:
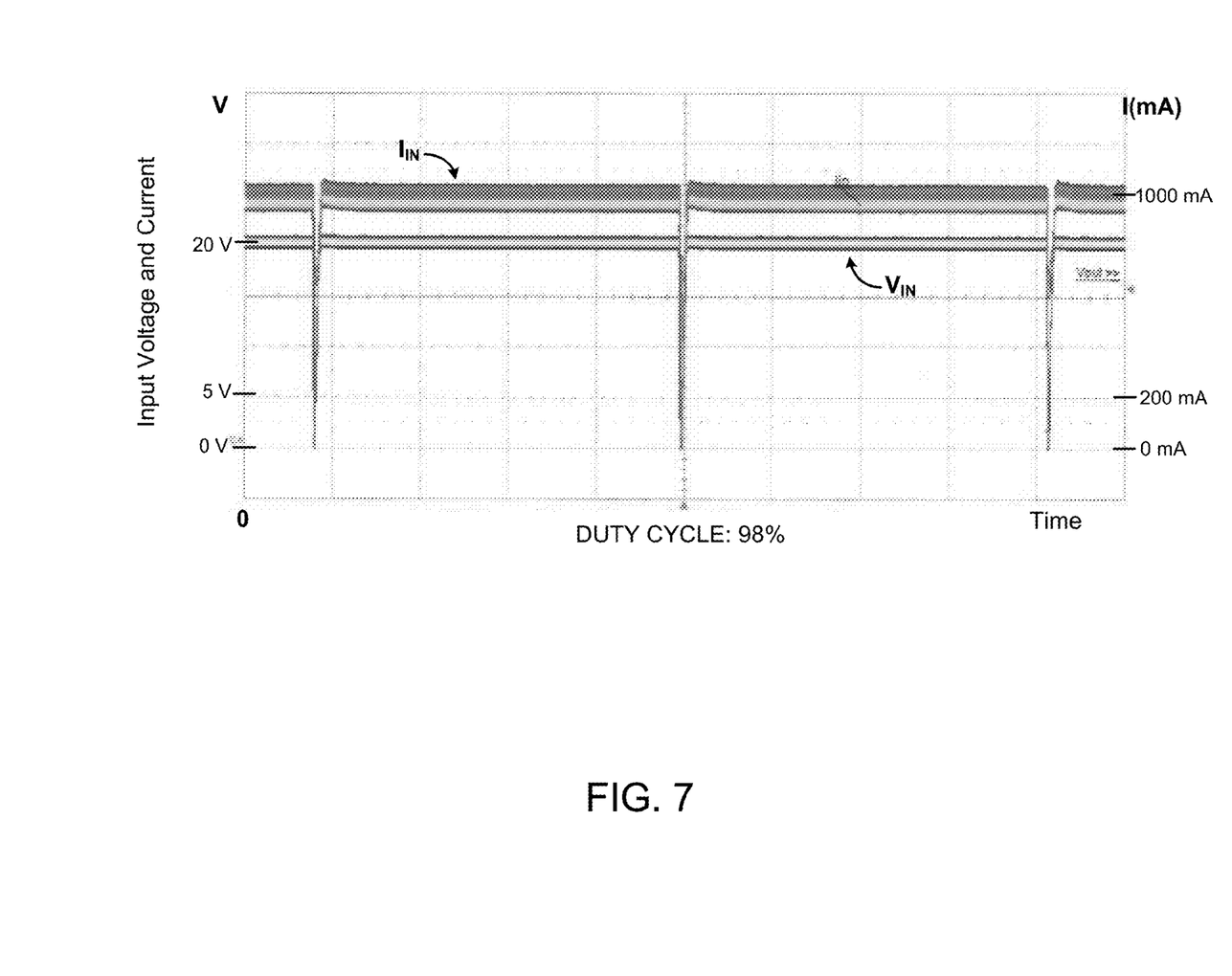
FIGS. 7-9 show plots of exemplary input current $I_{IN}$ and input voltage $V_{IN}$ versus time for the system illustrated in FIG. 6 for PWM duty cycles of 98%, 50% and 4%, respectively.
Figure 8:
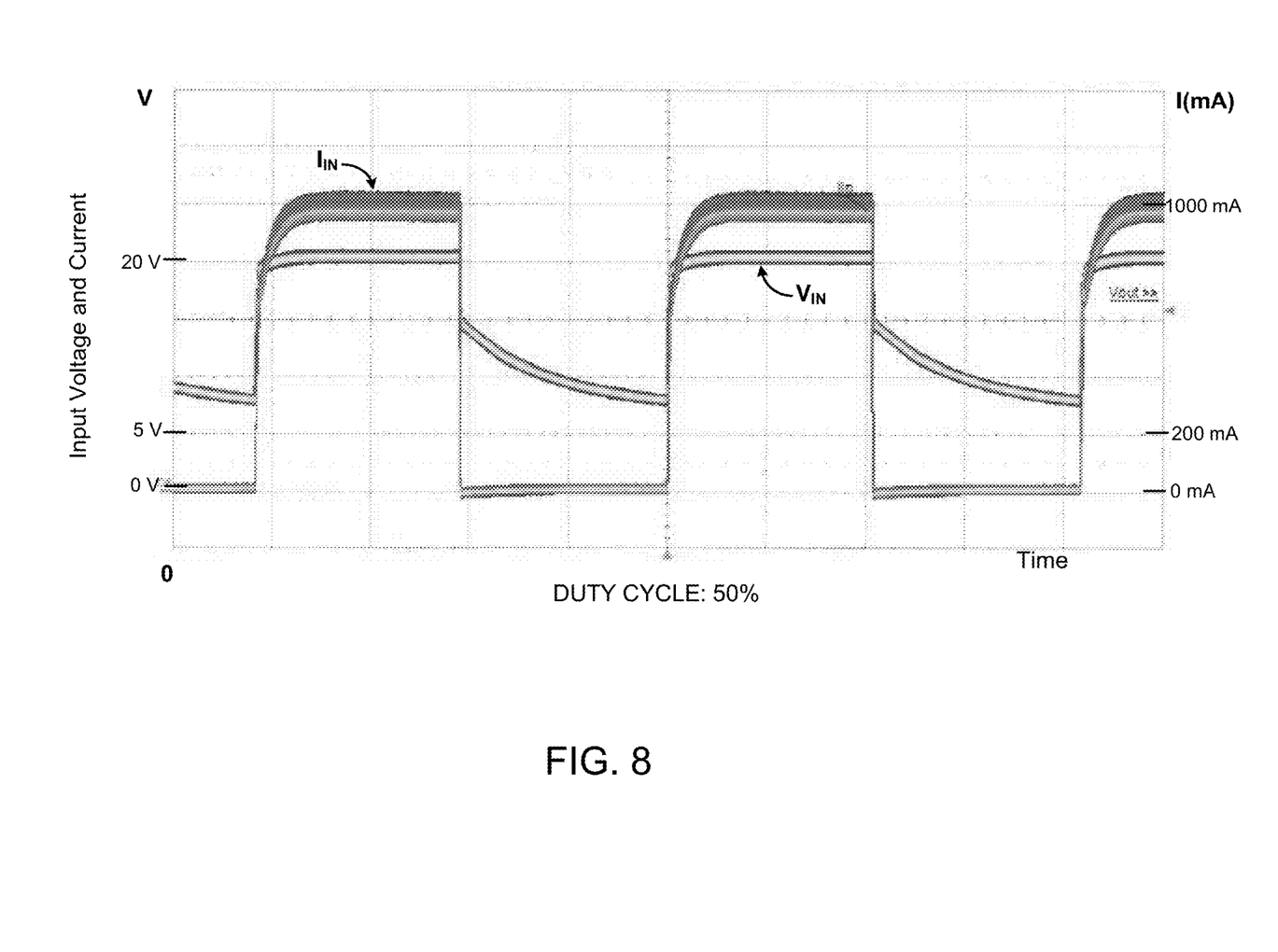
Figure 9:
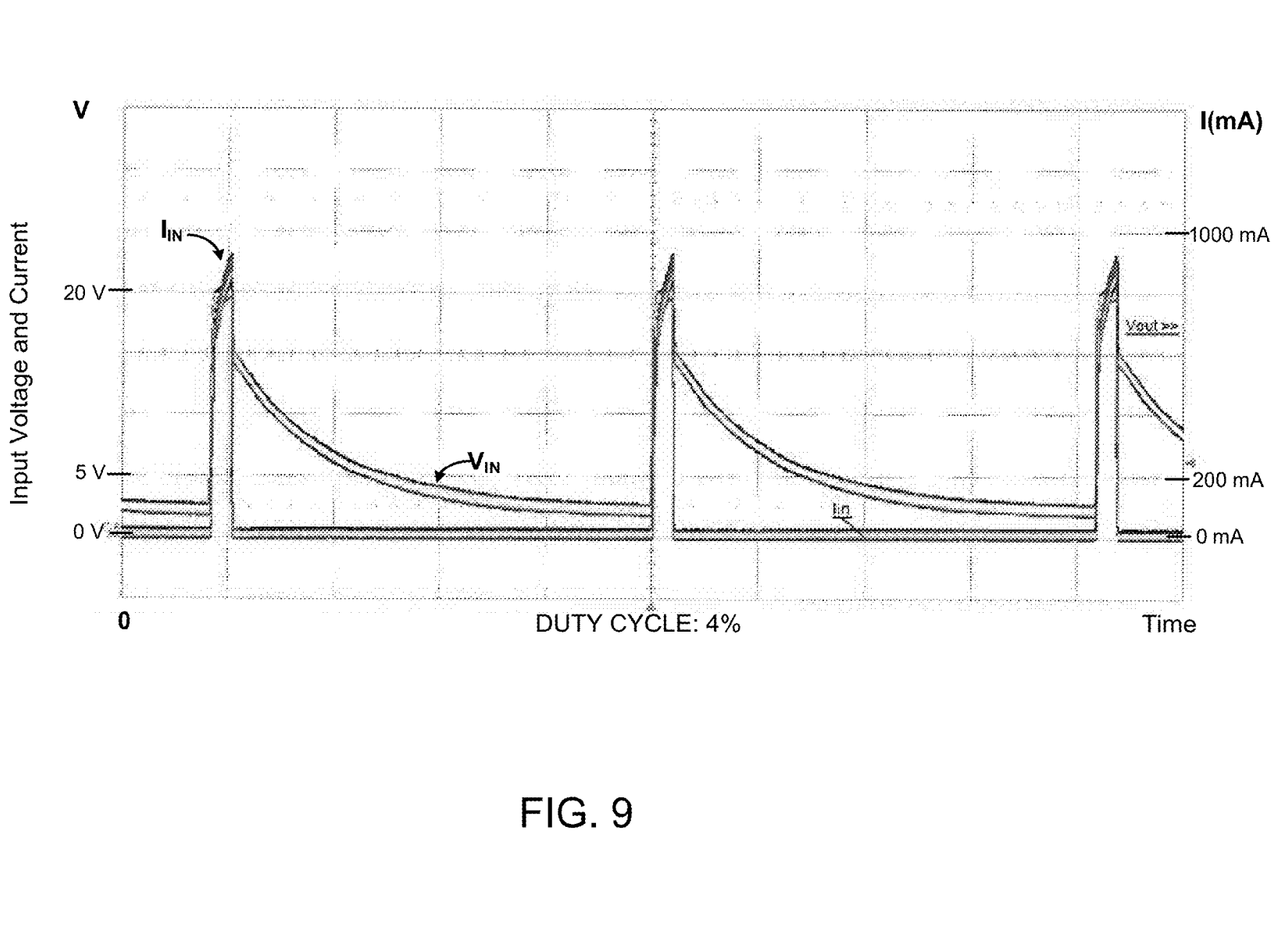

FIGS. 7 through 9 are plots of input current $I_{IN}$ and input voltage $V_{IN}$ versus time for the system 120c illustrated in FIG. 6. The plots illustrate effects of duty cycle on the current and voltage supplied by a constant current source that is being pulse width modulated, e.g., based on a dimming input. The input voltage and input current were provided by a constant current PWM dimmable power supply with PWM duty cycles of 98%, 50% and 4% for FIGS. 7, 8 and 9, respectively. The input current $I_{IN}$ ranges from a maximum of about 1.0 amperes (A) to minimum of about 0.0 A where the maximum corresponds to the ON portion of the period of the PWM signal and the minimum corresponds to the OFF portion of the PWM signal period. During the ON portion of the PWM signal period, the maximum voltage is about 20 volts (V) and during the OFF portion of the PWM signal period, the voltage $V_{IN}$ decays (due to the energy storage element, capacitor C2) to a value that depends on the duration of the OFF portion, as will be understood by one skilled in the art. For example, as illustrated in FIG. 8 (50% duty cycle), $V_{IN}$ decays to between 5 and 10 volts, which may still be above the minimum supply voltage $V_{CCmin}$ of the control circuit 114a.

FIG. 10 is a flowchart of a method 1000 of thermally protecting a plurality of solid state light sources, such as but not limited to strings of LEDs. The flowcharts illustrate the functional information one of ordinary skill in the art requires to fabricate circuits or to generate computer software to perform the processing required in accordance with the present invention. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. In addition, it is to be understood that other embodiments may include subcombinations of the illustrated steps and/or additional steps described herein. Thus, claims presented herein may be directed to all or part of the components and/or operations depicted in one or more figures.

More particularly, FIG. 10 is a block flow diagram of a method 1000 of thermally protecting a plurality of solid state light sources. First, a variable impedance element is coupled to a constant current source and a plurality of solid state light sources, e.g. in a series configuration, step 1001. The constant current source is configured to provide a current to the plurality of solid state light sources and to provide an output voltage to establish a supply voltage, as otherwise described herein. A temperature of the plurality of solid state light sources is then sensed using a temperature sensor, step 1002, as described herein. The variable impedance circuit is then driven, step 1003, by a control circuit, to adjust the current to the plurality of solid state light sources when a supply voltage $V_{CC}$ is greater than or equal to (i.e., at least) a minimum supply voltage $V_{CCmin}$. For example, the variable impedance circuit may be driven to a low impedance state when the sensed temperature is below a predetermined threshold temperature and to a high impedance state when the sensed temperature exceeds the predetermined threshold temperature. In this manner, a current source may be allowed to supply the solid state light sources when the sensed temperature is below the threshold temperature and may be prevented from supplying the solid state light sources during an over-temperature condition when the supply voltage $V_{CC}$ is greater than or equal to a minimum supply voltage $V_{CCmin}$.

In some embodiments, the variable impedance circuit is driven, step 1004, to a low impedance state when the supply voltage $V_{CC}$ is below the minimum supply voltage $V_{CCmin}$, independent of the temperature. Further, in some embodiments, the variable impedance circuit is driven, step 1005, via a comparator circuit of the control circuit, to a high impedance state when the sensed temperature is greater than or equal to a pre-determined threshold temperature, wherein the comparator circuit is coupled to a temperature threshold circuit and the temperature sensor. In such embodiments, the variable impedance circuit may be driven, step 1006, via a comparator circuit of the control circuit, to an impedance between a high impedance state and a low impedance state based on a difference between the sensed temperature and a pre-determined threshold temperature. Further, in such embodiments, the control circuit may be isolated from the variable impedance circuit, step 1007, via a low voltage control circuit, when the supply voltage $V_{CC}$ is below the minimum supply voltage $V_{CCmin}$, wherein the low voltage control circuit is part of the low voltage compensation circuit, as described herein. Further, in such embodiments, the supply voltage $V_{CC}$ may be maintained, step 1008, via an energy storage element of the low voltage compensation circuit, above the minimum supply voltage $V_{CCmin}$ for a time period after the output voltage $V_{IN}$ decreases to below the minimum supply voltage $V_{CCmin}$.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or the "microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A thermal protection circuit comprising:
a variable impedance circuit configured to be coupled to a constant current source and a plurality of solid state light sources, the constant current source configured to provide a current to the plurality of solid state light sources and to provide an output voltage to establish a supply voltage for the thermal protection circuit;
a temperature sensor configured to sense a temperature of the plurality of solid state light sources; and
a control circuit configured to receive the supply voltage and to drive the variable impedance circuit based on the sensed temperature, to adjust the current to the plurality of solid state light sources when the supply voltage is a least a minimum supply voltage of the control circuit, wherein the control circuit comprises: a temperature threshold circuit; and a comparator circuit; wherein the comparator circuit is coupled to the temperature threshold circuit and the temperature sensor, and the comparator circuit is configured to drive the variable impedance circuit to a high impedance state when the sensed temperature is greater than or equal to a pre-determined threshold temperature and wherein the comparator circuit is configured to drive the variable impedance circuit to an impedance between a high impedance state and a low impedance state based on a difference between the sensed temperature and a pre-determined threshold temperature.

2. The thermal protection circuit of claim 1, further comprising:
a low voltage compensation circuit configured to drive the variable impedance circuit to a low impedance state when the supply voltage is below the minimum supply voltage, independent of the sensed temperature.

3. The thermal protection circuit of claim 2, wherein the low voltage compensation circuit comprises a low voltage control circuit configured to isolate the control circuit from the variable impedance circuit when the supply voltage is below the minimum supply voltage.

4. The thermal protection circuit of claim 2, wherein the low voltage compensation circuit comprises an energy storage element configured to maintain the supply voltage above the minimum supply voltage for a time period after the output voltage decreases to below the minimum supply voltage.

5. The thermal protection circuit of claim 1, wherein the plurality of solid state light sources are located in a plurality of solid state light source modules.

6. A thermal protection lighting system comprising:
a plurality of solid state light sources located in one or more solid state light source modules;
a constant current source configured to provide a current to the plurality of solid state light sources and an output voltage to establish a supply voltage; and
a thermal protection circuit comprising:
  a variable impedance circuit coupled to the constant current source and the plurality of solid state light sources;
  a temperature sensor configured to sense a temperature of the plurality of solid state light sources; and
  a control circuit configured to receive the supply voltage and to drive the variable impedance circuit based on the sensed temperature to control the current to the plurality of solid state light sources when the supply voltage is a least a minimum supply voltage of the control circuit, wherein the control circuit comprises: a temperature threshold circuit; and a comparator circuit; wherein the comparator circuit is coupled to the temperature threshold circuit and the temperature sensor, and the comparator circuit is configured to drive the variable impedance circuit to a high impedance state when the sensed temperature is greater than or equal to a pre-determined threshold temperature and wherein the comparator circuit is configured to drive the variable impedance circuit to an impedance between a high impedance state and a low impedance state based on a difference between the sensed temperature and a pre-determined threshold temperature.

7. The thermal protection lighting system of claim 6, wherein the thermal protection circuit comprises a low voltage compensation circuit configured to drive the variable impedance circuit to a low impedance state when the supply voltage is below the minimum supply voltage, independent of the sensed temperature.

8. The thermal protection lighting system of claim 7, wherein the low voltage compensation circuit comprises a low voltage control circuit configured to isolate the control circuit from the variable impedance circuit when the supply voltage is below the minimum supply voltage.

9. The thermal protection lighting system of claim 7, wherein the low voltage compensation circuit comprises an energy storage element configured to maintain the supply voltage above the minimum supply voltage for a time period after the output voltage decreases to below the minimum supply voltage.

10. The thermal protection lighting system of claim 6, wherein the constant current source is configured to receive a dimming input signal and to provide the current to the plurality of solid state light sources based on the dimming input.

11. A method of providing thermal protection, the method comprising:
coupling a variable impedance circuit to a constant current source and a plurality of solid state light sources, the constant current source configured to provide a current to the plurality of solid state light sources and to provide an output voltage to establish a supply voltage;
sensing a temperature of the plurality of solid state light sources using a temperature sensor; and
driving the variable impedance circuit by a control circuit, to adjust the current to the plurality of solid state light sources when a supply voltage is at least a minimum supply voltage of the control circuit, wherein driving comprises: driving the variable impedance circuit, via a comparator circuit of the control circuit, to a high impedance state when the sensed temperature is greater than or equal to a pre-determined threshold temperature, wherein the comparator circuit is coupled to a temperature threshold circuit and the temperature sensor, wherein driving comprises: driving the variable impedance circuit, via a comparator circuit of the control circuit, to an impedance between a high impedance state and a low impedance state based on a difference between the sensed temperature and a pre-determined threshold temperature.

12. The method of claim 11, wherein driving comprises:
driving the variable impedance circuit to a low impedance state by a low voltage compensation circuit when the supply voltage is below the minimum supply voltage, independent of the sensed temperature.

13. The method of claim 12, further comprising:
isolating the control circuit from the variable impedance circuit, via a low voltage control circuit, when the supply voltage is below the minimum supply voltage, wherein the low voltage control circuit is part of the low voltage compensation circuit.

14. The method of claim 12, further comprising:
maintaining, via an energy storage element of the low voltage compensation circuit, the supply voltage above the minimum supply voltage for a time period after the output voltage decreases to below the minimum supply voltage.

15. The method of claim 11, wherein driving comprises:
driving the variable impedance circuit, via a comparator circuit of the control circuit, to an impedance between a high impedance state and a low impedance state based on a difference between the sensed temperature and a pre-determined threshold temperature.

* * * * *